United States Patent [19]

Fujii et al.

[11] Patent Number: 4,468,412
[45] Date of Patent: Aug. 28, 1984

[54] PROCESS FOR APPLYING LIGHT- OR RADIATION-CURABLE RESIN COMPOSITION TO POLYOLEFIN MOLDINGS

[75] Inventors: Yoshikazu Fujii, Shiga; Tomizou Kondo, Kyoto; Hideo Shinonaga, Osaka; Kaoru Kitadono, Shiga, all of Japan

[73] Assignee: Sumitomo Chemical Company, Limited, Osaka, Japan

[21] Appl. No.: 524,477

[22] Filed: Aug. 18, 1983

[30] Foreign Application Priority Data

Aug. 19, 1982 [JP] Japan .................................. 57-144375
Apr. 4, 1983 [JP] Japan .................................. 58-59596
Apr. 5, 1983 [JP] Japan .................................. 58-60490
Apr. 15, 1983 [JP] Japan .................................. 58-67644
May 10, 1983 [JP] Japan .................................. 58-82312

[51] Int. Cl.³ ............................................. B05D 3/06
[52] U.S. Cl. ...................................... 427/38; 427/40; 427/41; 427/54.1; 427/322; 427/393.5; 427/412.3; 427/430.1
[58] Field of Search .................... 427/38, 40, 41, 54.1, 427/322, 395.5, 412.3, 430.1

*Primary Examiner*—Bernard D. Pianalto
*Attorney, Agent, or Firm*—Sughrue, Mion, Zinn, Macpeak, and Seas

[57] ABSTRACT

A process for applying a light- or radiation-curable resin composition onto a polyolefin molding comprising surface treating a molding of polyolefin composition composed of 99.99 to 0 wt % of a polyolefin and 0.01 to 100 wt % of an olefinic polymeric compound having polar groups represented by the formula, —OCOR,

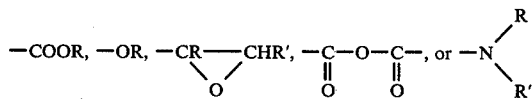

wherein R and R' are each a hydrogen atom or a hydrocarbon group having 1 to 8 carbon atoms, by at least one pretreatment method selected from the group consisting of a treatment with a halogenated hydrocarbon solvent, a low temperature plasma treatment, a corona discharge treatment, a flame treatment and an alkali degreasing treatment, and applying onto the thus treated molding surface a light- or radiation-curable resin composition, is disclosed.

13 Claims, No Drawings

PROCESS FOR APPLYING LIGHT- OR RADIATION-CURABLE RESIN COMPOSITION TO POLYOLEFIN MOLDINGS

The present invention relates to a process for applying a light- or radiation-curable resin composition to polyolefin moldings. More particularly, it relates to a process for applying a light- or radiation-curable resin composition to molded items of polyolefin resins produced by pressure forming, extrusion molding, or injection molding.

Polyolefins are in general use on account of their superior mechanical properties such as stiffness and tensile strength, chemical resistance, and processability. However, they have a disadvantage of being poor in scratch resistance.

Efforts have been made to overcome this disadvantage by blending a modifier that improves the scratch resistance or by applying a scratch-resistant material onto the surface. The former is limited in the improvement of scratch resistance, and the latter has a problem that satisfactory adhesion is not obtained between the non-polar polyolefin substrate and the coating material.

In order to overcome the above-mentioned disadvantage, the present inventors carried out a series of researches and found a process that provides good adhesion, hardness, and scratch resistance. The present invention is based on these findings.

Accordingly, it is an object of this invention to provide a process for applying a light- or radiation-curable resin composition onto polyolefin moldings, said process comprising treating moldings of polyolefin composition containing a polar olefinic polymeric compound with at least one of halogenated hydrocarbon solvent, low-temperature plasma, corona discharge, flame, or alkali degreasing; applying, if required, a primer solution containing polar groups onto the treated surface, followed by drying; and subsequently applying a light- or radiation-curable resin composition onto the treated surface, whereby the coating surface superior in scratch resistance, hardness, and adhesion (peel strength) is obtained.

The polar olefinic polymeric compound used in this invention improves polyolefin in coatability. It should have an affinity for the coating material. The polar group is represented by the formula —OCOR,

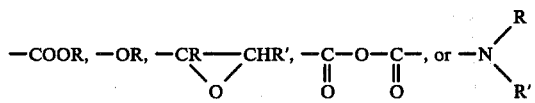

(where R and R' are hydrogen atom or hydrocarbon group of carbon number 1 to 8).

Examples of such compounds include ethylene-vinyl acetate copolymer or partial saponified product thereof, ethylene-(meth)acrylic acid copolymer, ethylene-(meth)acrylate ester copolymer or partial hydrolyzate thereof, ethylene-maleic anhydride copolymer or partial hydrolyzate thereof or partial esterified product thereof, ethylene-glycidyl methacrylate copolymer or partial ring opening product thereof obtained by treating with an organic acid, primary amine, or secondary amine, acrylic acid-modified polypropylene, maleic anhydride-modified polypropylene, and ethylene-methacrylic acid dialkylaminoethyl ester. The olefinic polymeric compound containing such polar groups increases the surface tension of the polyolefin and hence increases the adhesion strength of the coating material.

For the improvement in the adhesion of the coating material, the polyolefin may be incorporated with styrene-butadiene random copolymer or styrene-butadiene block copolymer, if required. Moreover, the polyolefin may be incorporated with glass fiber, talc, wood powder, calcium carbonate, and other fillers in an amount of 0 to 40 parts by weight, if required.

Although the adhesion of the coating material is improved by the polar olefinic polymeric compound, the polyolefin composition may be further incorporated with other non-polar polyolefins for improvement of other performance.

Examples of the polyolefin used in this invention include polyethylene, polypropylene, ethylene-propylene copolymer, propylene-ethylene-butene terpolymer, ethylene-pentene copolymer, and polybutene. They may be used in combination with one another.

The pretreatment in this invention is accomplished by at least one of treatment with halogenated hydrocarbon solvent, low temperature plasma treatment, corona discharge treatment, flame treatment, and alkali degreasing treatment.

The treatment with halogenated hydrocarbon solvent is advantageous because the solvent is flame retardant or non-combustible. Examples of the halogenated hydrocarbon solvent include methylene chloride, chloroform, carbon tetrachloride, 1,1,1-trichloroethane, 1,1,2,2-tetrachloroethylene, trichloroethylene, perchloroethylene, methylene bromide, bromoform, Freon IB, and Freon BF.

The surface treatment is accomplished by exposing the substrate to the vapor of halogenated hydrocarbon solvent, dipping the substrate in the solvent or moistening the substrate with the solvent. The first two methods are preferred for uniform treatment. It is accomplished to dip polyolefin resin moldings in a halogenated hydrocarbon solvent or to expose the moldings to the vapor of the solvent at 60° to 100° C. for 5 to 120 seconds. Moreover, it is preferred to accomplish these treatments at 70° to 90° C. for 15 to 60 seconds.

The low temperature plasma treatment is accomplished by exposing the polyolefin moldings to low temperature plasma generated by glow discharge or high-frequency discharge in oxygen, nitrogen, argon, or helium (oxygen is preferable) at a pressure lower than 10 mmHg, preferably 0.1 to 1.0 mmHg. The treatment should be carried out so that the surface wetting tension immediately after treatment is 38 to 65 dyne/cm$^2$, preferably 42 to 55 dyne/cm$^2$. Insufficient treatment is not effective. Excessive treatment will decompose the surface of the moldings and decrease the adhesion strength.

The corona treatment is accomplished by subjecting the substrate to corona discharge which is generated between an electrode connected to a high-voltage generator and a grounded electrode covered with a dielectric material. Corona discharge treatment is commonly used for treatment of films. The degree of corona treatment is adjusted by varying the electric power and treating time. The corona treatment in this invention can be accomplished with any commercial equipment. For treatment of substrates thicker than 5 mm, one having the maximum output greater than 2 kW is desirable. Treatment should be performed to such an extent that the surface wetting tension immediately after treatment is 38 to 65 dyne/cm$^2$. If the extent of treatment is less than this limit, the treatment is less effective in adhesion strength. If the extent of treatment is in excess of this limit, the surface of the substrate will be decomposed and the adhesion strength will decrease.

The flame treatment is accomplished by subjecting for a short time the substrate to flames at 1000° to 2800° C., containing a sufficient amount of excess air. The treatment should be carried out to such an extent the surface wetting tension immediately after treatment is 38 to 65 dyne/cm$^2$, and preferably 42 to 55 dyne/cm$^2$.

The alkali degreasing treatment is accomplished by dipping the polyolefin moldings in an aqueous alkali solution or by spraying or brushing an aqueous alkali solution to the polyolefin moldings, followed by rinsing and drying. The alkali for the aqueous alkali solution is metal silicate, metal phosphate, metal carbonate, sodium hydroxide, or potassium hydroxide. Aqueous solutions of metal silicate, sodium hydroxide, and potassium hydroxide are preferable. The aqueous alkali solution should have pH 9 to 14, preferably pH 11 to 14. Solutions having a pH lower than 9 do not have sufficient degreasing power and do not provide sufficient adhesion strength. For increased adhesion strength, the treatment may be followed by washing with a neutral detergent such as anionic surface active agent and non-ionic surface active agent.

One of the above-mentioned pretreatments will provide sufficient adhesion strength for the light- or radiation-curable resin composition applied to the substrate. However, the adhesion strength may be further improved by applying a primer solution to the substrate, although the use of a primer solution is not essential.

Such a primer is prepared by dissolving in a solvent an olefinic polymeric compound having at least one polar group represented by the formula —X, —OCOR,

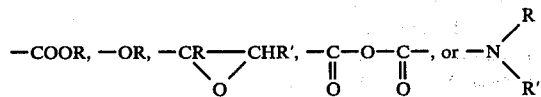

(where X is a halogen, and R and R' are a hydrogen atom or hydrocarbon group of carbon number 1 to 8) as a vehicle.

The solids content in the pirmer solution should be 0.01 to 90 wt%. If it is less than 0.01 wt%, sufficient adhesion strength is not obtained, and if it is in excess of 90 wt%, the solution is too viscous to apply in the usual way.

Examples of the polar group contained in the solids include —X, —OCOR,

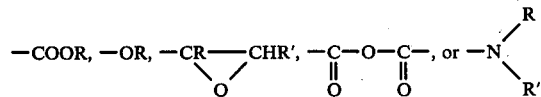

(where X is a halogen, and R and R' are a hydrogen atom or hydrocarbon group of carbon number 1 to 8). The polar group should be contained in an amount of 1 to 60 wt% for the solids of the olefinic polymeric compound. If the content is less than 1 wt%, the primer does not bond firmly to the curable resin composition due to lack of polar groups; and if it is in excess of 60 wt%, the primer does not bond well to the polyolefin moldings due to excessive polar groups. More than two kinds of polar groups may be used in combination to increase the adhesion strength.

The compound used for the primer includes, for example, chlorinated polyethylene, brominated polyethylene, chlorinated polypropylene, chlorinated ethylene-propylene copolymer, ethylene-vinyl acetate copolymer or partially saponified product thereof, ethylene-vinyl acetate copolymer modified with maleic anhydride, ethylene-(meth)acrylic acid copolymer, ethylene-(meth)acrylate ester copolymer or partial hydrolyzate thereof, ethylene-maleic anhydride copolymer or partial hydrolyzate thereof, ethylene-glycidyl methacrylate copolymer or partial ring opening product thereof obtained by treating with an organic acid, primary amine, or secondary amine, acrylic acid-modified polypropylene, maleic anhydride-modified polypropylene, and ethylene-methacrylic acid dialkylaminoethyl ester.

The solvent for the primer should be one which is commercially available, properly volatile, and capable of completely dissolving or uniformly dispersing the primer vehicle. Examples of such solvent include carbon tetrachloride, trichloroethylene, 1,1,1-trichloroethane, and other halogenated aliphatic hydrocarbons; toluene, xylene, benzene, decalin, tetralin, and other aromatic hydrocarbons; chlorobenzene and other halogenated aromatic hydrocarbons; acetone, methyl ethyl ketone, and other ketones; and tetrahydrofuran. They may be used in combination with one another.

The primer may be applied to the polyolefin moldings by brushing, spraying, or dipping.

According to this invention, the polyolefin moldings undergo one of the pretreatments selected from treatment with a halogenated hydrocarbon solution, low temperature plasma treatment, corona discharge treatment, flame treatment, and alkali degreasing treatment. If necessary, the polyolefin moldings are further coated with a primer. Finally, the thus treated polyolefin moldings are coated with a light- or radiation-curable resin composition.

Examples of the light- or radiation-curable resin composition include known unsaturated polyester resin, urethane-acrylic resin, malamine-acrylic resin, acrylated polyester resin, and epoxy-acrylic resin. They may be used individually or in combination with one another.

The light- or radiation-curable resin composition may be incorporated with an ethylenic unsaturated monomer for viscosity adjustment or crosslinking. Examples of such monomer include styrene, vinyl acetate, 2-vinylpyridine, N-vinylpyrrolidone, N-vinylcarbazole, methyl acrylate, ethyl acrylate, butyl acrylate, lauryl acrylate, stearyl acrylate, benzyl acrylate; hydroxyethyl acrylate, cyclohexyl acrylate, ethylene glycol diacrylate, diethylene glycol diacrylate, triethylene glycol diacrylate, 1,6-hexane diol diacrylate, trimethylol propane triacrylate, pentaerythritol tetracrylate, methacrylic acid, ethyl methacrylate, butyl methacrylate, ethylene glycol dimethacrylate, diethylene glycol dimethacrylate, triethylene glycol dimethacrylate, 1,6-hexanediol dimethacrylate, trimethylolpropane trimethacrylate, and pentaerythritol tetramethacrylate. They may be used individually or in combination with one another.

To impart flexibility and other performance, the curable resin composition may be incorporated with saturated polyester resin, acrylic resin, alkyd resin, ethylene-vinyl acetate copolymer, and other polymers, and pigment, coloring agent, and plasticizer so long as the features of the invention are not adversely affected.

To effect curing with ulraviolet rays or electron beams, the light- or radiation-curable resin composition of this invention may be incorporated with a known photopolymerization initiator such as benzoin methyl ether, benzoin ethyl ether, benzoin isopropyl ether, and other benzoins; benzophenone, Michler's ketone, and other ketones; azobisisobutyronitrile and other azo compounds; and anthraquinone and other quinones. They may be used in combination with one another.

The light- or radiation-curable resin composition of this invention may be diluted with a proper solvent such as ethyl acetate and n-butyl acetate prior to use, if necessary.

The light- or radiation-curable resin composition of this invention may be applied to the moldings by brushing, spraying, or dipping.

The invention is now described with reference to the following examples.

SYNTHESIS EXAMPLE 1

In a flask equipped with a stirrer, thermometer, evacuating apparatus and cooling condenser were placed 390 g of hexamethoxymethylmelamine (Sumimal M-100, a product of Sumitomo Chemical Co., Ltd.) 480 g of ethylene glycol monoacrylate and 0.38 g of 2-methylhydroquinone. 0.9 ml of 85% phosphoric acid was added to carry out reaction at 80° to 85° C. under reduced pressure. When 128 g of distillate was obtained, evacuation was stopped and the flask was cooled. Thus, there was obtained a slightly yellowish transparent viscous liquid. This is designated as light-curable resin liquid A.

SYNTHESIS EXAMPLE 2

In a flask equipped with a stirrer, thermometer, and cooling condenser were placed 222 g of isophorone diisocyanate, 114 g of n-butyl acetate, 139 g of 2-hydroxyethyl acrylate and 0.114 g of phenothiazine. Reaction was carried out at 90° C. for 3 hours. Thus there was obtained a slightly yellowish transparent viscous resin liquid. To this resin liquid were added dropwise 209 g of Desmophen #1150 (a product of Sumitomo Bayer Urethane Co., Ltd.) and 0.209 g of dibutyl tin diacetate. Reaction was carried out at 90° C. for 4 hours. The resulting slightly yellowish viscous liquid is designated as light-curable resin liquid B.

EXAMPLE 1

Test specimens measuring 2 mm thick, 90 mm wide and 150 mm long were prepared by injection molding at 230° C. from a polypropylene block copolymer having a melt index of 2 and containing 16 wt% of ethylene.

The test specimens were treated with the vapor of 1,1,1-trichloroethane at 74° C. for 30 seconds. Then, the test specimens were coated by spraying with a primer solution containing chlorinated polypropylene (chlorine content: 28%) as the major ingredient.

On the other hand, a ligh-curable resin composition was prepared as follows:

Aronix S-8030 (polyester acrylate, a product of Toagosei Chemical Industry Co., Ltd.): 50 parts
  Resin liquid A (as obtained in Synthesis Example 1): 35 parts
n-Butyl acrylate: 15 parts
Benzoin isopropyl ether: 3 parts This resin composition was applied to the primed test specimens using a bar coater #26 (film thickness: 26μ). The test specimens were finally exposed to the light from a mercury lamp of 80 W/cm. Exposure was performed 15 times by running the test specimens on a belt conveyor at a speed of 10 m/min.

The coated test specimens of the light-curable resin composition were found to have a pencil hardness of H. The number of small squares (2×2 mm) remaining in the crosscut adhesion test was 100/100. The test specimens were subjected to ten cycles of temperature test, each cycle consisting of 2 hours at −20° C., 0.5 hours at 23° C. and 2 hours at 70° C. After this temperature test, the test specimens showed no change in appearance and crosscut adhesion. The test specimens were subjected to accelerated weathering conditions for 400 hours using a sunshine weather-ometer (black panel temperature: 63° C., with water spray). This weathering test did not affect the gloss of the specimens.

COMPARATIVE EXAMPLE 1

The polypropylene test specimens used in Example 1 were found to have a pencil hardness of 2B.

EXAMPLE 2

Test specimens measuring 2 mm thick, 90 mm wide and 150 mm long, were prepared by injection molding at 230° C. from a resin composition composed of 90 parts by weight of filled polyolefin (80 wt% of homopolypropylene having a melt index of 8 and 20 wt% of talc) and 10 parts by weight of ethylene-glycidyl methacrylate having a melt index of 50 (82 wt% of ethylene and 18 wt% of glycidyl methacrylate).

The test specimens were subjected to pretreatment, coated with the light-curable resin composition, and irradiated in the same manner as in Example 1, except that the application of the primer was omitted.

The coated test specimens of the light-curable resin composition were found to have a pencil hardness of 2H. The number of small squares (2×2 mm) remaining in the crosscut adhesion test was 100/100.

COMPARATIVE EXAMPLE 2

The polypropylene test specimens used in Example 2 were found to have a pencil hardness of B.

COMPARATIVE EXAMPLE 3

Example 2 was repeated except that pretreatment with 1,1,1-trichloroethylene was omitted. The number of small squares remaining in the crosscut adhesion test was 60/100.

EXAMPLE 3

Example 1 was repeated except that the test specimens were prepared from propylene block copolymer (ethylene content: 13 wt%, melt index: 2) containing 24 wt% of talc.

The pencil hardness was F, and the result of the crosscut adhesion test was 100/100. Incidentally, the pencil hardness of the test specimens was 3B.

EXAMPLE 4

The steps up to the application of the primer were carried out in the same way as in Example 1. The light-curable resin composition was prepared as follows:

U-4HA (Urethan-acrylate made by Shin-Nakamura Kagaku K.K.): 50 parts
Resin liquid A: 35 parts n-Butyl acrylate: 15 parts
Benzoin isopropyl ether: 3 parts This resin composition was applied to the primed test specimens using bar coaters #7 (film thickness: 6μ), #12 (film thickness: 12μ), and #26 (film thickness: 26μ). The test specimens were finally exposed to the light from a mercury lamp of 80 W/cm. Exposure was performed 20 times by running the test specimens on a belt conveyor at a speed of 10 m/min.

The coating film of the light-curable resin composition was found to have a pencil hardness of F (for film thickness of 6μ), F (for film thickness of 12μ), and H (for film thickness of 26μ). The number of small squares remaining in the crosscut adhesion test was 100/100.

EXAMPLE 5

Example 1 was repeated except that the light-curable resin composition was replaced by the following one.
Aronix S-8030: 60 parts
Trimethylolpropane triacrylate: 25 parts
n-Butyl acrylate: 15 parts
Benzoin isopropyl ether: 3 parts The pencil hardness was F, and the result of the crosscut adhesion test was 100/100.

EXAMPLE 6

5-mm thick test specimens were prepared by extrusion from Sumitomo Noblen AD 571 (MI=0.6, propylene-ethylene block copolymer). The test specimens were treated with high-frequency low temperature plasma so that the surface wetting tension of 48 to 50 dyne/cm$^2$ was obtained.

Then, the test specimens were coated by spraying with a primer which is a toluene solution containing 5 wt% of a modified product (chlorine content 27%) obtained by chlorinating acrylic acid-modified polypropylene (containing 2 wt% of acrylic acid).

On the other hand the light-curable resin composition was prepared as follows:
Resin liquid B (as obtained in Synthesis Example 2): 80 parts
Trimethylolpropane triacrylate: 20 parts
n-Butyl acetate: 20 parts
Benzophenone: 3 parts This resin composition was applied to the primed test specimens using a bar coater #26 (film thickness: 26μ). The test specimens were finally exposed to the light from a mercury lamp of 80 W/cm. Exposure was performed 15 times by running the test specimens on a belt conveyor at a speed of 10 m/min.

The coating film of the light-curable resin composition was found to have a pencil hardness of H, and a surface gloss of 95% (obtained by measuring the reflectance of the light at an incident angle of 45° using a surface gloss meter). The number of small squares remaining in the crosscut adhesion test was 100/100. The test specimens were subjected to ten cycles of temperature test, each cycle consisting of 2 hours at −20° C., 0.5 hours at 23° C., and 2 hours at 70° C. After this temperature test, the test specimens showed no change in appearance and crosscut adhesion. The test specimens were subjected to accelerated weathering conditions for 400 hours using a sunshine weather-ometer (black panel temperature 63° C., with water spray). This weathering test did not affect the gloss of the specimens.

COMPARATIVE EXAMPLE 4

The polypropylene test specimens used in Example 6 were found to have a pencil hardness of 2B and a surface gloss of 78%.

EXAMPLE 7

The test specimens prepared in Example 2 were treated with high-frequency low temperature plasma so that the surface wetting tension of 51 to 53 dyne/cm$^2$ was obtained.

The treated test specimens were coated with the same light-curable resin composition as in Example 6, without being coated with a primer, followed by irradiation.

The coating film of the light-curable resin composition was found to have a pencil hardness of 2H. The number of small squares remaining in the crosscut adhesion test was 100/100.

COMPARATIVE EXAMPLE 5

Example 7 was repeated except that the treatment with high-frequency low temperature plasma was omitted. The result of the crosscut adhesion test was 60/100.

EXAMPLE 8

The test specimens prepared in Example 6 were treated with corona discharge using a corona discharge generator (Model HFS-202, made by Kasuga Denki K.K.) so that the surface wetting tension of 48 to 50 dyne/cm$^2$ was obtained.

The treated test specimens were coated with the same primer and light-curable resin composition as in Example 6, followed by irradiation.

The coating film of the light-curable resin composition was found to have a pencil hardness of 2H. and a surface gloss of 95% (obtained by measuring the reflectance of the light at an incident angle of 45° using a surface gloss meter). The number of small squares (2×2 mm) remaining in the crosscut adhesion test was 100/100. The test specimens were subjected to ten cycles of temperature test, each cycle consisting of 2 hours at −20° C., 0.5 hours at 23° C., and 2 hours at 70° C. After this temperature test, the test specimens showed no change in appearance and crosscut adhesion. The test specimens were subjected to accelerated weathering conditions for 400 hours using a sunshine weather-ometer (black panel temperature 63° C., with water spray). This weathering test did not affect the gloss of the specimens.

EXAMPLE 9

The test specimens prepared in Example 2 were subjected to flame treatment so that the surface wetting tesnion of 45 to 50 dyne/cm$^2$ was obtained.

The treated test specimens were coated with the same light-curable resin composition as in Example 6, without being coated with a primer, followed by irradiation.

The coating film of the light-curable resin composition was found to have a pencil hardness of 2H. The number of small squares remaining in the crosscut adhesion test was 100/100.

COMPARATIVE EXAMPLE 6

Example 9 was repeated except that the flame treatment was omitted.

The result of the crosscut adhesion test was 60/100.

COMPARATIVE EXAMPLE 7

Example 6 was repeated except that corona discharge treatment was carried out so that the sruface wetting tension of 30 to 35 dyne/cm² was obtained.

Also, Example 1 was repeated except that corona discharge treatment was carried out so that the surface wetting tension of 70 dyne/cm² (wetted with water) was obtained.

The result of the crosscut adhesion test was 90/100 in the former case and 95/100 in the latter case.

EXAMPLE 10

The test specimens prepared in Example 1 were dipped, with agitation, in an aqueous solution (pH 13.5) of sodium orthosilicate ($Na_4SiO_4$) at 60° C. for 3 minutes, followed by rinsing. The test specimens were then coated with the same primer and light-curable resin composition as used in Example 6, followed by irradiation.

The pencil hardness of the coating film was H, the surface gloss was 95% (obtained by measuring the reflectance of the light at an incident angle of 45° using a surface gloss meter), and the number of small squares (2×2 mm) remaining in the crosscut adhesion test was 100/100.

EXAMPLE 11

Example 10 was repeated except that the test specimens were dipped, with agitation, in an aqueous solution of nonionic surface active agent at 50° C. for 2 minutes after pretreatment with an alkaline aqueous solution.

The pencil hardness of the coating film of H, the surface gloss was 95%, and the number of small squares (2×2 mm) remaining in the crosscut adhesion test was 100/100.

COMPARATIVE EXAMPLE 8

Example 10 was repeated except that an aqueous solution (pH 8) of sodium hydrogen carbonate ($NaHCO_3$) was used for pretreatment.

The result of the crosscut adhesion test was 80/100.

EXAMPLE 12

The test specimens prepared in Example 2 were subjected to pretreatment with the same alkaline aqueous solution as used in Example 10. Without being coated with a primer, the test specimens were coated with the light-curable resin composition as in Example 10, followed by irradiation.

The pencil hardness of the coating film was 2H, and the result of the crosscut adhesion test was 100/100.

COMPARATIVE EXAMPLE 9

Example 12 was repeated except that the pretreatment with an alkaline aqueous solution was omitted.

The result of the crosscut adhesion test was 60/100.

EXAMPLE 13

Test specimens measuring 2 mm thick, 90 mm wide, and 150 mm long, were prepared by injection molding at 180° C. from ethylene-vinyl acetate copolymer (vinyl acetate: 20 wt%, and melt index: 20).

The test specimens were coated by spraying with a primer solution containing 2 wt% of maleic anhydride-modified ethylene-vinyl acetate copolymer prepared by modifying 100 parts by weight of ethylene-vinyl acetate copolymer (vinyl acetate: 16 wt%, [$\eta$] 0.54 in xylene at 75° C.) with 0.12 parts by weight of maleic anhydride.

On the other hand, a ligh-curable resin composition was prepared as follows:
  Resin liquid B: 80 parts
  n-Butyl acrylate: 20 parts
  Benzophenone: 3 parts
This resin composition was applied to the primed test specimens using a bar coater #20 (film thickness: 20μ). The test specimens were finally exposed to the light from a 4 kW mercury lamp (80 W/cm). Exposure was performed 15 times by running the test specimens on a belt conveyor at a speed of 10 m/min.

The coating film of the light-curable resin composition was tested with respect to adhesion (tape peeling), surface gloss, surface hardness, flex resistance, and weather resistance. The results are shown in Table 1.

COMPARATIVE EXAMPLE 10

The surface gloss and surface hardness were measured for the injection-molded test specimens prepared in Example 13, with the surface treatment not performed. The results are shown in Table 1

TABLE 1

| | Surface treatment | |
|---|---|---|
| | UV hardener (Example 13) | No UV hardener (Comp. Example 10) |
| Adhesion (tape test) | no peeling | — |
| Surface gloss (reflectance %) | 92 | 81 |
| Surface hardness | no scratches | scratches |
| Flex resistance | no cracks | — |
| Weather resistance | no change | — |

Test methods:
  Adhesion: Crosscut adhesion test
  Surface gloss: The reflectance of light at an incident angle of 45° was measured using a surface gloss meter.
  Surface hardness: The treated or untreated surface was pressed with a fingernail, and the presence or absence of scratches was observed.
  Flex resistance: The test specimen was bent 180° around a mandrel ½ inches in diameter, and the presence or absence of cracks was observed.
  Weather resistance: The test specimens were subjected to accelerated weathering conditions using a sunshine weather-ometer (black panel temperature 63° C., with water spray) for 400 hours.

Good adhesion was obtained between the substrate and the ligh-curable resin composition. The coated test specimens (Example 13) were superior in appearance, scratch resistance, and flexibility to the uncoated test specimens (Comparative Example 10).

EXAMPLE 14

The test specimens prepared in Example 2 were primed by spraying with a toluene solution containing 3 wt% of chlorinated polypropylene (chlorine content: 28 wt%). Then, the primed test specimens were coated with the same light-curable resin composition as used in Example 6, followed by irradiation.

The pencil hardness of the coating film of H, and the number of small squares (2×2 mm) remaining in the crosscut adhesion test was 100/100.

The test specimens were subjected to ten cycles of temperature test, each cycle consisting of 2 hours at −20° C., 0.5 hours at 23° C., and 2 hours at 70° C. After this temperature test, the test specimens showed no change in appearance and crosscut adhesion. The test specimens were subjected to accelerated weathering conditions for 400 hours using a sunshine weather-ometer (black panel temperature 63° C., with water spray). This weathering test did not affect the gloss of the specimens.

EXAMPLE 15

Test specimens measuring 2 mm thick, 90 mm wide, and 150 mm long, were prepared by injection molding at 230° C. from a resin composition made up of the following components.

- 5 parts by weight of a copolymer (melt index: 300) composed of 75 wt% of ethylene and 25 wt% of N,N-dimethylaminoethyl methacrylate
- 80 parts by weight of a block copolymer composed of 65.5 parts by weight of polypropylene ([η]: 1.8) and 14.5 parts by weight of ethylene-propylene random copolymer ([η]: 6.5) containing 39 wt% of ethylene
- 15 parts by weight of ethylene-propylene random copolymer ([η]: 1.8) containing 47 wt% of ethylene.

The test specimens were coated by spraying with a primer solution and the light-curable resin composition in the same manner as in Example 6.

The pencil hardness of the coated film was 2H, the result of the crosscut adhesion test was 100/100, and the surface gloss was 94%. No cracks occurred in the flex resistance test. No change occurred in appearance in the weathering test with 400-hr irradiation.

The same methods as used in Example 13 were used for measuring the surface gloss, flex resistance, and weathering resistance.

COMPARATIVE EXAMPLE 11

The test specimens prepared from the polypropylene composition in Example 15 were found to have a pencil hardness of B and a surface gloss of 78.

COMPARATIVE EXAMPLE 12

Example 14 was repeated except that the ethylene-glycidyl methacrylate copolymer was not added.

The result of the crosscut adhesion test was 70/100.

While the invention has been described in detail and with reference to specific embodiments thereof, it will be apparent to one skilled in the art that various changes and modifications can be made therein without departing from the spirit and scope thereof.

What is claimed is:

1. A process for applying a light- or radiation-curable resin composition onto a polyolefin molding comprising surface treating a molding of polyolefin composition composed of 99.99 to 0 wt% of a polyolefin and 0.01 to 100 wt% of an olefinic polymeric compound having polar groups represented by the formula, —OCOR,

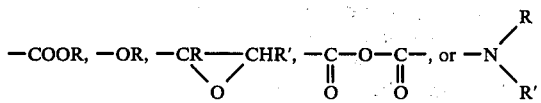

wherein R and R' are each a hydrogen atom or a hydrocarbon group having 1 to 8 carbon atoms,
by at least one pretreatment method selected from the group consisting of a treatment with a halogenated hydrocarbon solvent, a low temperature plasma treatment, a corona discharge treatment, a flame treatment and an alkali degreasing treatment, and applying onto the thus treated molding surface a light- or radiation-curable resin composition to thereby give the molding surface excellent properties in scratch resistance, hardness and adhesion.

2. A process for applying a light- or radiation-curable resin composition onto polyolefin molding comprising surface treating a molding of a polyolefin composition composed of 99.99 to 0 wt% of a polyolefin and 0.01 to 100 wt% of an olefinic polymeric compound having polar groups represented by the formula, —OCOR,

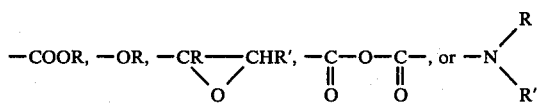

wherein R and R' are each a hydrogen atom or a hydrocarbon group having 1 to 8 carbon atoms,
by at least one pretreatment method selected from the group consisting of a treatment with a halogenated hydrocarbon solvent, a low temperature plasma treatment, a corona discharge treatment, a flame treatment and an alkali degreasing treatment;
coating the molding surface with a primer solution containing as a vehicle at least one olefinic polymeric compound having at least one polar group represented by the formula, —X, —OCOR,

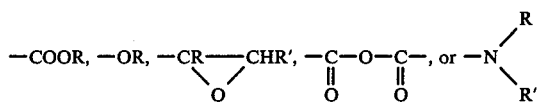

wherein X is a halogen atom, and R and R' are each a hydrogen atom or a hydrocarbon group having 1 to 8 carbon atoms,
and drying; and then applying onto the thus treated molding surface a light- or radiation-curable resin composition to thereby give the molding surface excellent properties in scratch resistance, hardness and adhesion.

3. A process for applying a light- or radiation-curable resin composition onto a polyolefin molding, comprising coating a moldings of polyolefin composition composed of 99.99 to 0 wt% of a polyolefin and 0.01 to 100 wt% of an olefinic polymeric compound containing polar groups represented by the formula, —OCOR,

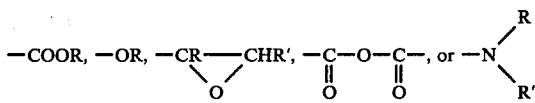

wherein R and R' are each a hydrogen atom or a hydrocarbon group having 1 to 8 carbon atoms,
with a primer solution containing as a vehicle at least one olefinic polymeric compound having at least one polar group represented by the formula, —X, —OCOR,

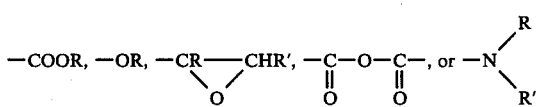

wherein X is a halogen atom, and R and R' are each a hydrogen atom or a hydrocarbon group having 1 to 8 carbon atoms, and drying, and then applying onto the thus treated molding surface a light- or radiation-curable resin composition to thereby give the molding surface excellent properties in scratch resistance, hardness and adhesion.

4. A process as claimed in claim 1, wherein the pretreatment is accomplished by dipping said molding in a halogenated hydrocarbon solvent or exposing said molded article to a vapor of a halogenated hydrocarbon solvent at 60° to 100° C. for 5 to 120 seconds.

5. A process as claimed in claim 2, wherein the pretreatment is accomplished by dipping said molding in a halogenated hydrocarbon solvent or exposing said molded article to a vapor of a halogenated hydrocarbon solvent at 60° to 100° C. for 5 to 120 seconds.

6. A process as claimed in claim 1, wherein the pretreatment is accomplished by exposing the molding surface to low temperature plasma such that the resulting surface has a surface tension of 38 to 65 dyne/cm$^2$.

7. A process as claimed in claim 2, wherein the pretreatment is accomplished by exposing the molding surface to low temperature plasma such that the resulting surface has a surface tension of 38 to 65 dyne/cm$^2$.

8. A process as claimed in claim 1, wherein the pretreatment is accomplished by subjecting the molding surface to a corona discharge treatment or a flame treatment such that the resulting surface has a surface tension of 38 to 65 dyne/cm$^2$.

9. A process as claimed in claim 2, wherein the pretreatment is accomplished by subjecting the molding surface to a corona discharge treatment or a flame treatment such that the resulting surface has a surface tension of 38 to 65 dyne/cm$^2$.

10. A process as claimed in claim 1, wherein the pretreatment is accomplished by dipping said molding in an alkaline aqueous solution having a pH of 9 to 14 or applying onto the molding surface an alkaline aqueous solution having a pH of 9 to 14, followed by rinsing and drying.

11. A process as claimed in claim 2, wherein the pretreatment is accomplished by dipping said molding in an alkaline aqueous solution having a pH of 9 to 14 or applying onto the molding surface an alkaline aqueous solution having a pH of 9 to 14, followed by rinsing and drying.

12. A process as claimed in claim 2, wherein said primer solution has a solids content of 0.01 to 90 wt%.

13. A process as claimed in claim 3, wherein said primer solution has a solids content of 0.01 to 90 wt%.

* * * * *